Feb. 6, 1945.  R. B. COTTRELL  2,368,641
CAR TRUCK
Filed July 30, 1942  3 Sheets-Sheet 1
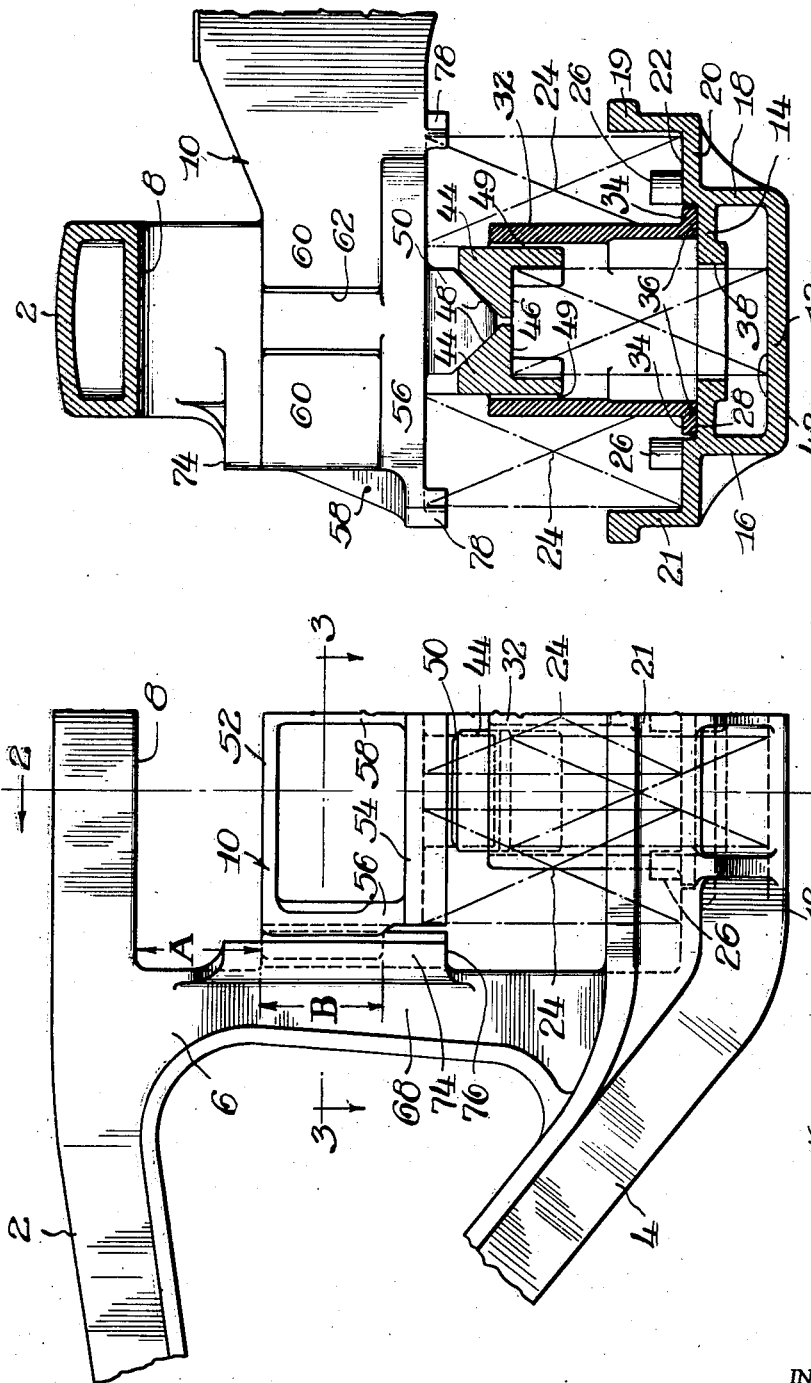
INVENTOR.
Robert B. Cottrell,
BY
Atty

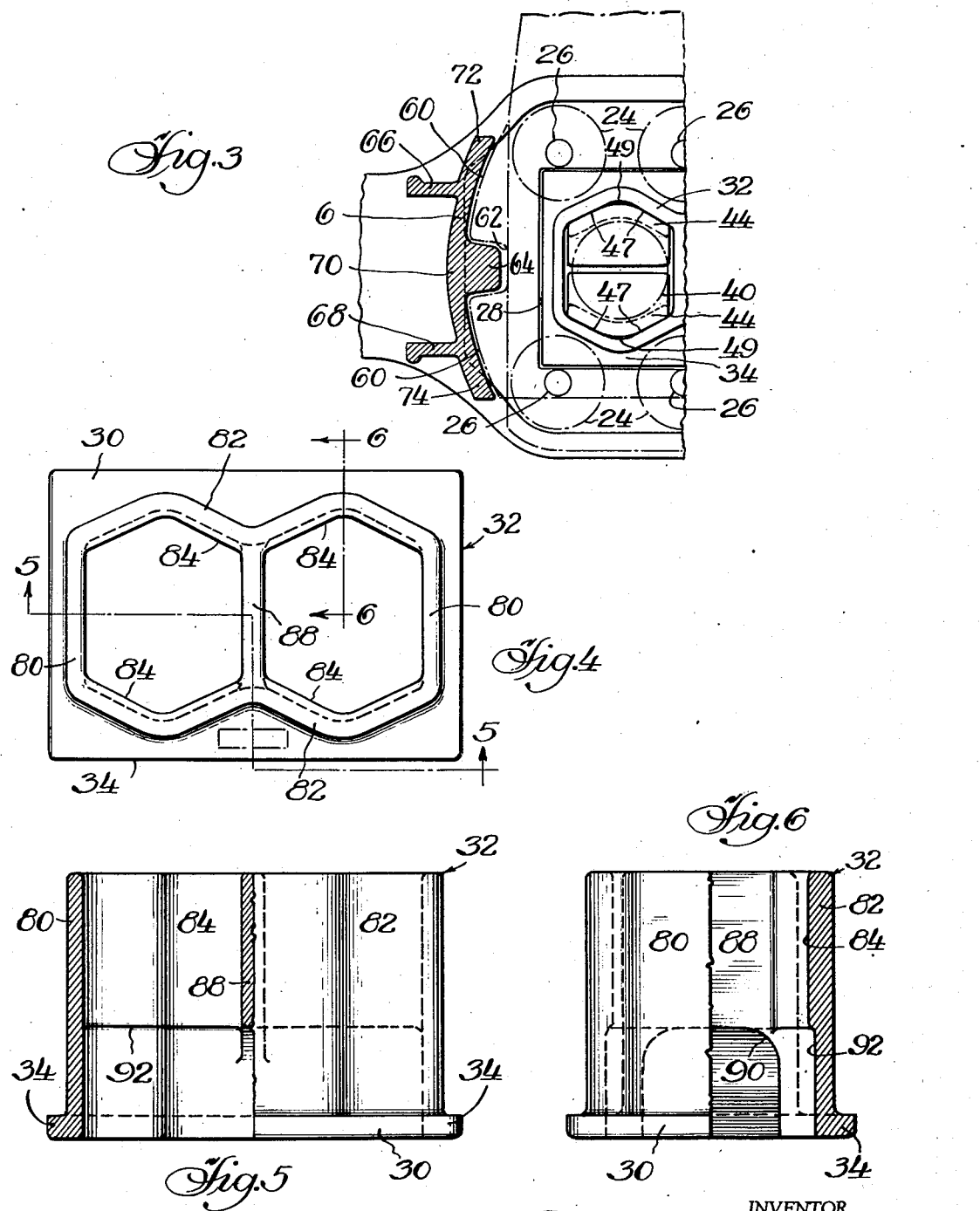

Feb. 6, 1945. R. B. COTTRELL 2,368,641
CAR TRUCK
Filed July 30, 1942 3 Sheets-Sheet 3

INVENTOR.
Robert B. Cottrell
BY
Atty

Patented Feb. 6, 1945

2,368,641

UNITED STATES PATENT OFFICE 2,368,641

CAR TRUCK

Robert B. Cottrell, Chicago, Ill., assignor to American Steel Foundries, Chicago, Ill., a corporation of New Jersey Application July 30, 1942, Serial No. 452,854

32 Claims. (Cl. 105—197)

My invention relates to four wheel freight car trucks and particularly to a novel form of high speed quick wheel change type in which a ride control feature is incorporated.

The general object of my invention is to devise a novel form of quick wheel change four wheel freight car truck wherein a ride control feature may be incorporated in such manner as to provide vertical stabilization as well as lateral and out of squareness control.

A more specific object of my invention is to devise such a freight car truck wherein depending lugs of wedge shape may be integrally formed on or associated with the bolster for actuation of friction shoes which may engage walls of a housing supported on the side frame.

A different object of my invention is to devise a four wheel freight car truck for high speed service embodying a ride control feature wherein friction shoes may be resiliently supported in a housing carried on the spring seat of the side frame in such manner that said shoes may be operated by means projecting downwardly from the superposed bolster.

Still another object of my invention is to so arrange the friction housing of such a truck as that described and illustrated that the bolster supporting springs may serve as means of retaining said housing in its normal position, said housing also serving to enclose additional springs which may operate in conjunction with friction shoes also enclosed therein.

My invention also contemplates such an arrangement as that described wherein the main bolster supporting springs may be seated on the top chord of the tension member of the side frame, but certain of the supporting springs may also be seated on the bottom chord of the tension member, thus affording a longer travel spring and a more convenient arrangement for the friction device associated with the truck.

In the drawings,

Figure 1 is a fragmentary side elevation of a railway car truck embodying my invention, only one end of the truck structure being shown inasmuch as opposite ends thereof are substantially identical.

Figure 2 is a sectional view of the truck arrangement shown in Figure 1, the section being taken approximately in the transverse vertical plane indicated by the line 2—2 of Figure 1, the bolster end being shown in side elevation.

Figure 3 is a further sectional view of the truck arrangement shown in Figures 1 and 2, the section being taken approximately in the transverse horizontal plane indicated by the line 3—3 in Figure 1 with the fragmentary end portion of the bolster shown in phantom lines.

Figures 4, 5 and 6 show my novel form of friction housing, Figure 4 being a top plan view thereof, Figure 5 a side elevation, half in section, the section being taken approximately in the vertical plane indicated by the line 5—5 of Figure 4, and Figure 6 being an end view, also partly in section, said section being taken in the transverse vertical plane indicated by the line 6—6 of Figure 4.

Figure 7:
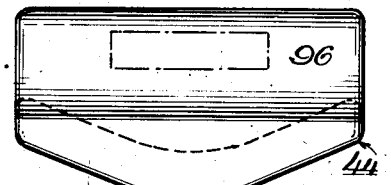
Figure 8:
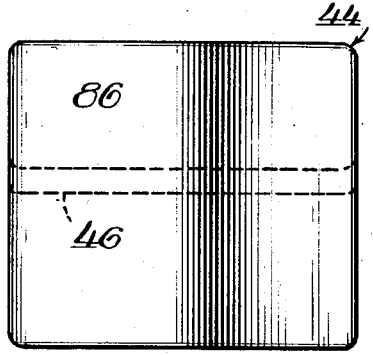
Figure 9:
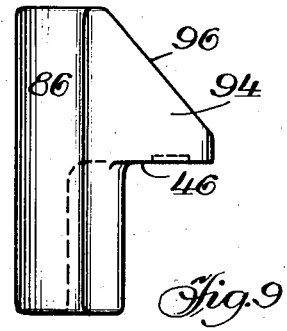

Figures 7, 8 and 9 show my novel form of friction shoe, Figure 7 being a top plan view thereof, Figure 8 a side elevation taken on the friction side thereof, and Figure 9 is an edge elevation thereof taken from the right as seen in Figure 7.

Figure 10:
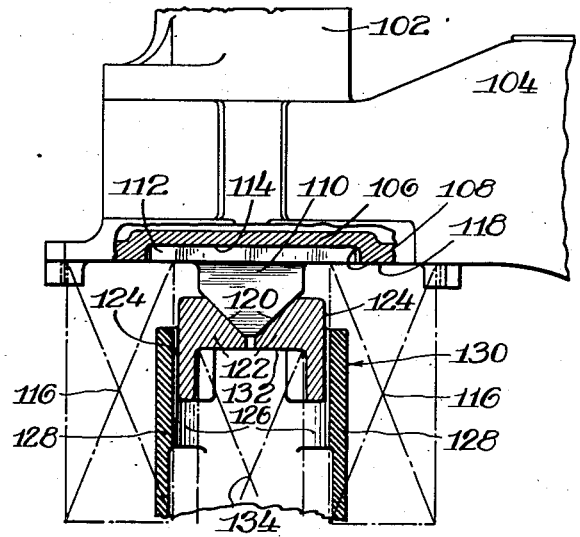

Figure 10 is a fragmentary sectional view comparable to Figure 2 showing a modification thereof wherein the shoe operating wedge member is removably associated with the bolster instead of integrally formed therewith.

Figure 11:
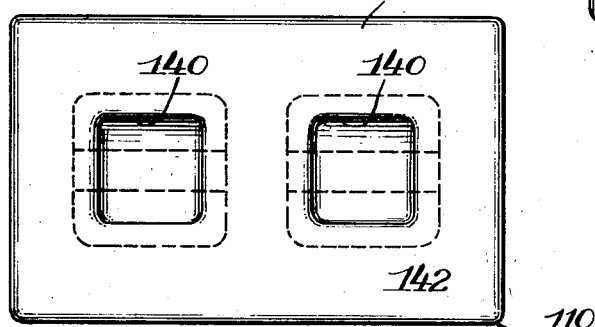
Figure 12:
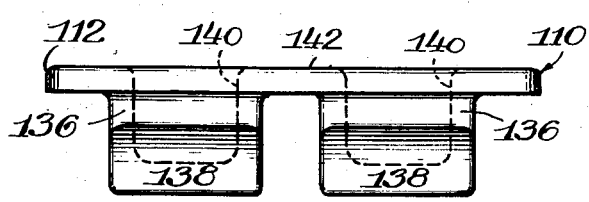
Figure 13:
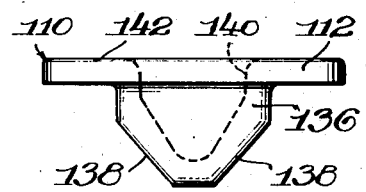

Figures 11, 12 and 13 show my novel form of follower wedge as illustrated in Figure 10, Figure 11 being a top plan view thereof, Figure 12 a side elevation, and Figure 13 an end elevation.

In detail, my novel truck comprises a truss type side frame of well known form comprising a compression member 2, a tension member 4 with the integral column 6 forming with said members the central bolster opening 8 within which may be received the end of the bolster 10. The spring seat portion of the side frame is of well known form, the tension member of said side frame having a box-section beneath the bolster opening 8 with the bottom chord 12, the top chord 14, the outboard wall 16, and the inboard wall 18, said top chord 14 being widened as at 20 and formed with upstanding inboard and outboard flanges 19 and 21 to form the spring seat 22 on which may be supported a plurality of coil springs diagrammatically indicated at 24, 24, said springs 24 affording support means for the superposed bolster 10. The spring seat 22 may carry upstanding spring positioning lugs 26, 26 and the top chord 14 may have a central recess 28, the rectangular form of which may best be seen from the plan view of Figure 3. In said recess may be received the base 30 of the friction housing generally designated 32 (Figures 4, 5 and 6), said base comprising a horizontal flange 34 about the perimeter thereof which may seat as at 36 on the top chord 14 within said before-mentioned shallow rectangular recess 28, said flange 34 having the same depth as said recess so that the superposed springs 24, 24 may overlie said flange and hold said housing in normal position.

At each side of the spring seat 22 and within the shallow recess 28 the top chord 14 of the tension member may be formed with a round opening 38 through which may pass an auxiliary spring diagrammatically indicated at 40, each of said springs 40 thus being seated as at 42 on the bottom chord 12 of the tension member and may extend upwardly within the housing and afford support for the associated friction shoes 44, 44 which may be superposed thereon, said shoes having shelf means affording a seat for the associated spring 40 as at 46, 46. The details of the housing 32 and the associated friction shoes 44, 44 are hereinafter described but it may be noted that each friction shoe has a V-shaped friction surface in engagement as at 47, 47 (Figure 3) with a complementary friction face on the adjacent side wall of the housing 32. The apex of the V friction face of each shoe 44 may have slight clearance from the adjacent friction face of the housing as may be noted as 49, 49 (Figures 2 and 3) in order to facilitate a fit therebetween. The friction shoes 44, 44 have diagonal face engagement as at 48, 48 with oppositely disposed faces of the wedge lug 50 depending from the bottom wall of the bolster 10 and being integrally formed therewith as illustrated in the modification of Figures 1 to 3.

The bolster 10 is of well known box-section comprising the top web 52, the bottom web 54, the side wall 56, and the central vertical rib 58, the upper portion of each side wall 56 having arcuate configuration as best seen at 60, 60 in Figure 3, said arcuate configuration being interrupted centrally thereof by the vertical channel 62 for cooperative engagement with the vertical guide lug 64 centrally formed on the adjacent column 6. From a consideration of Figures 1 to 3 it may be noted that each column 6 has a general U-section with the inboard web 66, the outboard wall 68, and the transverse wall 70, said transverse wall being continued in inboard and outboard flanges 72 and 74 to form relatively large bolster guide surfaces for cooperative engagement with the arcuate portions 60, 60 of the bolster. The laterally projecting inboard and outboard flanges 72 and 74 extend along only that portion of the column which may have engagement with the side wall of the bolster in its normal vertical movements on the supporting spring group, the lower ends of said flanges terminating at 76 and the upper end of each inboard flange 72 is cut away to afford a wider portion A at the top of the bolster opening (Figure 1) sufficiently below the compression member 2 to permit application or removal of the bolster 10 at the top of the bolster opening, the guide lug on each side of the bolster having a vertical depth B slightly less than the said portion A. The bolster 10 is formed with depending inboard and outboard spring positioning lugs 78, 78 (Figure 2).

The housing 32 is shown in detail in Figures 4, 5 and 6 wherein it may be noted that it is a box-like structure comprising the before-mentioned base 30 affording a seat for said housing, vertical end walls 80, 80, and vertical side walls 82, 82, each of said side walls having a shallow W form and so presenting two V-shaped friction surfaces 84, 84 complemenetary in shape to the friction surfaces 86, 86 presented on the respective friction shoes. The housing has also the intermediate vertical wall 88 parallel with the end walls 80, 80 and dividing the housing into two portions within which the respective sets of shoes may operate. The wall 88 may be cored away as at 90 adjacent the bottom of the housing and the lower portion of each side wall 82 may be relieved as at 92 (Figures 5 and 6) below the friction surface 84 thereof in order to prevent the wearing of shoulders by said friction shoe 44, shown in detail in Figures 7, 8 and 9.

Each shoe is of generally rectangular form in elevation as seen in Figure 8, the top half thereof comprising a shelf portion 94, the upper surface 96 of which may be diagonally arranged for engagement as at 48, as already described, with the bolster wedge 50, and the bottom surface of the shelf 94 may afford a seat as at 46 for the auxiliary spring 40, already mentioned. Each friction shoe presents a relatively large friction surface 86 covering one entire face thereof, said friction surface 86 being of wedge form or V-shape complementary to the adjacent friction surface 84 of the friction housing with which it may engage. The angle of the wedge engaging surface 96 of each shoe may be modified as desired depending upon the friction characteristics wished to be developed, the modification of said angle affording means of varying the pressure of each shoe against the adjacent surface of the housing.

In the modification illustrated in Figure 10 the side frame 102 is substantially identical with that of the previously described modification and the bolster 104 is similar to the bolster of said previous modification except that the bottom wall 106 of the bolster 104 is recessed as at 108 to accommodate the removable wedge member 110, the detailed form of said wedge member being illustrated in Figures 11 to 13 inclusive. Said wedge member includes a base 112 which may seat as at 114 in the before-mentioned recess 108, said base 112 having a thickness corresponding to the depth of the recess 108 so that the springs 116, 116 seating against said base and against the spring seat 118 on the bolster 104 may retain said wedge member 110 in its normal operating position.

The wedge member 110 operates in manner substantially identical with that of the previous modification having diagonal face engagement as at 120, 120 with the respective friction shoes 122, 122, and said friction shoes may have V-shaped friction surfaces 124, 124 engaging complementary friction faces 126, 126 on the opposite side walls 128, 128 of the housing generally designated 130, said housing having a form substantially identical to that described for the previous modification and being similarly positioned on the side frame (not shown). Each friction shoe presents a spring seat 132 for abutment with the auxiliary spring 134 which may extend through the top web of the tension member of the side frame and seat on the bottom web thereof as described for the previous modification.

The follower wedge 110 is illustrated in detail in Figures 11, 12 and 13 and comprises as already indicated, the base 112 of rectangular form and the spaced depending V-shaped lugs 136, 136 each of which presents a plurality of diagonally arranged friction faces 138, 138 for engagement with complementary surfaces on the friction shoes 122, 122 as already indicated at 120 (Figure 10). Each of the lugs 136 may be cored out as at 140 to reduce the weight thereof and make a satisfactory structure for casting if desired. The base 112 presents a flat upper surface 142 for abutment as at 114 with the bottom wall 106 of the bolster, as already described.

Thus in the modification now under consideration the wedge follower is detachably associated with the bolster and functions in conjunction therewith in substantially the same manner as in the case of the previous modification. The removable feature however facilitates application and removal of the bolster from the opening of the associated side frame.

It is to be understood that I do not wish to be limited by the exact embodiments of the device shown which are merely by way of illustration and not limitation as various and other forms of the device will, of course, be apparent to those skilled in the art without departing from the spirit of the invention or the scope of the claims.

I claim:

1. In a four wheel railway car truck, a side frame having tension and compression members and spaced columns defining a bolster opening, said tension member having a box-section beneath said opening with top and bottom chords, said top chord being widened and formed with upstanding flanges defining a spring seat, a spring assembly on said seat, a bolster projecting into said bolster opening and supported on said assembly, said assembly comprising coil springs and a friction device, said friction device including a housing having a base recessed in said top chord and presenting spaced V-shaped friction surfaces at opposite sides thereof, coil springs on said seat at opposite sides of said housing overlying portions of said base, auxiliary springs seated on said bottom chord and supporting friction shoes in said housing in engagement with said surfaces respectively, and wedge means on said bolster in operative engagement with said shoes.

2. In a four wheel railway car truck, a side frame having tension and compression members and spaced columns defining a bolster opening, said tension member having a box-section beneath said opening with top and bottom chords, said top chord being widened and formed with upstanding flanges defining a spring seat, a spring assembly on said seat, a bolster projecting into said bolster opening and supported on said assembly, said assembly comprising coil springs and a friction device, said friction device including a housing having a base recessed in said top chord and presenting spaced V-shaped friction surfaces at opposite sides thereof, coil springs on said seat at opposite sides of said housing overlying portions of said base, auxiliary springs seated on said bottom chord and supporting friction shoes in said housing in engagement with said surfaces respectively, and a plurality of wedge means on said bolster each engaging a plurality of said shoes.

3. In a railway car truck, a truss side frame having tension and compression members and spaced columns defining a bolster opening, arcuate guide faces centrally positioned on said columns, a composite spring group on said tension member in said opening and including friction means, a bolster supported on said spring group with arcuate side walls in complementary engagement with said guide faces, and wedge means associated with said bolster for actuation of said friction means, said friction means comprising a housing having a base recessed in said tension member, an auxiliary spring in said housing, friction shoes on said auxiliary spring in frictional engagement with spaced walls of said housing and operatively engaging said wedge means, said spring group comprising coil springs each overlying a portion of said base to maintain said housing in normal assembled relationship, certain springs of said group affording support for said wedge means.

4. In a railway car truck, a truss side frame having upper and lower members and spaced columns defining a bolster opening, arcuate guide faces centrally positioned on said columns, a composite spring group on said tension member in said opening and including friction means, a bolster supported on said spring group with arcuate side walls in complementary engagement with said guide faces, and wedge means associated with said bolster for actuation of said friction means, said friction means comprising a housing having a base recessed in said tension member, an auxiliary spring in said housing, and friction shoes on said auxiliary spring in frictional engagement with spaced walls of said housing and operatively engaging said wedge means, said spring group comprising coil springs each overlying a portion of said base to maintain said housing in normal assembled relationship.

5. A railway car truck having a truss side frame with upper and lower members and spaced columns defining a bolster opening, a spring group including a friction device on said lower member in said opening, a bolster positioned on said group with arcuate side walls and vertical guide lugs in complementary engagement with said columns, and wedge means associated with said bolster for actuation of said friction device, said friction device comprising a housing with a flange recessed in said spring seat, auxiliary springs in said housing and friction shoes supported on said auxiliary springs in frictional engagement with said housing and said wedge means, certain springs of said spring group supporting said wedge means in normal operative position.

6. In a railway car truck, a truss type side frame having a central bolster opening and including a box-section tension member beneath said opening with a top chord defining a spring seat thereon, a composite spring group including a friction device on said tension member in said opening, and a bolster supported on said group with wedge means engaging said device for actuation thereof, said device comprising a housing positioned on said tension member and presenting a plurality of sets of V-shaped friction surfaces, a plurality of coil springs in said housing supporting respective sets of friction shoes in engagement with said surfaces, each set of friction shoes having vertical wedge face engagement with spaced surfaces of said housing and reversely arranged diagonal face engagement with certain of said wedge means.

7. In a railway car truck, a truss type side frame having a central bolster opening and including a box-section tension member beneath said opening with a widened top chord defining a spring seat thereon, a composite spring group including a friction device on said tension member in said opening, and a bolster supported on said group with wedge means engaging said device for actuation thereof, said device comprising a housing positioned on said tension member and presenting a plurality of sets of V-shaped friction surfaces, a plurality of coil springs in said housing supporting respective sets of friction shoes in engagement with said surfaces, each of said friction shoes having diagonal face engagement with certain of said wedge means.

8. In a railway car truck, a truss side frame having top and bottom members and spaced columns defining a bolster opening, arcuate guide faces centrally positioned on said columns, a composite spring group on said tension member in said opening and including spaced friction means, a bolster supported on said spring group with arcuate side walls in complementary engagement with said guide faces, and removable wedge means associated with said bolster for actuation of said friction means, each of said friction means comprising a housing having a portion recessed in said tension member, an auxiliary spring in said housing, and friction shoes on said auxiliary spring in frictional engagement with spaced walls of said housing and operatively engaging the adjacent wedge means.

9. In a railway car truck, a truss type side frame having a central bolster opening and including a box-section tension member beneath said opening with a top chord defining a spring seat thereon, a composite spring group including a friction device on said tension member in said opening, and a bolster supported on said group with wedge means engaging said device for actuation thereof, said device comprising a housing presenting sets of opposed V-shaped friction surfaces, auxiliary coil springs in said housing, each supporting a plurality of friction shoes in engagement with one set of surfaces, each set of said friction shoes having operative engagement with certain of said wedge means.

10. A railway car truck having a truss side frame with tension and compression members and spaced columns defining a bolster opening, a spring group including a friction device on said tension member in said opening, a bolster positioned on said group with arcuate side walls and vertical guide lugs in complementary engagement with said columns, and spaced wedge means associated with said bolster for actuation of said friction device, said device comprising a friction housing with sets of opposed V-shaped friction surfaces, auxiliary springs in said housing, sets of friction shoes supported on said auxiliary springs respectively and in engagement with respective sets of friction faces on said housing, the shoes of each set having reversely arranged diagonal face engagement with one of said wedge means.

11. A railway car truck having a truss side frame with tension and compression members and spaced columns defining a bolster opening, a spring group including a friction device on said tension member in said opening, a bolster positioned on said group with arcuate side walls and vertical guide lugs in complementary engagement with said columns, and wedge means associated with said bolster for actuation of said friction device, said friction device comprising a housing with a flange recessed in said spring seat, auxiliary springs in said housing and friction shoes supported on said auxiliary springs in frictional engagement with said housing and said wedge means, certain springs of said group being under direct compression between said wedge means and said flange.

12. A railway car truck having a truss side frame with upper and lower members and spaced columns defining a bolster opening, a spring group including a friction device on said lower member in said opening, a bolster positioned on said group with arcuate side walls and vertical guide lugs in complementary engagement with said columns, and removable wedge means associated with said bolster for actuation of said friction device, said device comprising a housing with sets of opposed V-shaped friction surfaces and opposed friction shoes engaging each set, each set of said shoes having reversely arranged diagonal face engagement with an adjacent wedge means.

13. A railway car truck having a truss side frame with tension and compression members and spaced columns defining a bolster opening, a spring group including a friction means on said tension member in said opening, a bolster positioned on said group with arcuate side walls and vertical guide lugs in complementary engagement with said columns, and a removable member having spaced wedge means associated with said bolster for actuation of said friction means, said friction means comprising a friction casing with sets of opposed V-shaped friction surfaces, and a plurality of friction shoes engaging each set and an associated wedge means, certain springs of said group affording support for said shoes and other springs of said group being under direct compression between a portion of said housing and said removable member and acting to retain said removable member in position against said bolster.

14. In a railway car truck, a truss side frame having tension and compression members and spaced columns defining a bolster opening, said tension member beneath said opening having a box-section with a top chord widened to define a spring seat, a composite spring assembly on said seat including coil springs and a friction device, and a bolster seated on said assembly in said opening with removable means engaging said device for actuation thereof, said means comprising spaced wedge members, and said device comprising a housing with sets of opposed V-shaped vertical friction surfaces and sets of opposed friction shoes engaging said surfaces respectively, each set of said shoes engaging one of said wedge means.

15. In a railway car truck, a supporting member having a spring seat, a composite spring group thereon including a friction device comprising a housing, a member supported on said spring group, and removable wedge means associated therewith for actuation of said device, certain springs of said group acting under direct compression between a portion of said housing and said wedge means to retain said wedge means in position against said supported member and other springs of said group supporting sets of shoes in frictional engagement with said housing and said wedge means.

16. A railway car truck having a truss side frame with upper and lower members and spaced columns defining a bolster opening, a spring group including a friction device on said lower member in said opening, a bolster positioned on said group with arcuate side walls and vertical guide lugs in complementary engagement with said columns, and wedge means associated with said bolster for actuation of said friction device, said friction device comprising a housing with a flange recessed in said spring seat, auxiliary springs in said housing and friction shoes supported on said auxiliary springs in frictional engagement with said housing and said wedge means, certain springs of said group reacting directly between said housing and said wedge means.

17. A railway car truck having a truss side frame with upper and lower members and spaced columns defining a bolster opening, a spring group including a friction device on said lower member in said opening, a bolster positioned on said group with arcuate side walls and vertical guide lugs in complementary engagement with said columns, and wedge means associated with said bolster for actuation of said friction device, said friction device comprising a housing with a flange recessed in said spring seat, auxiliary springs in said housing and friction shoes supported on said auxiliary springs in frictional engagement with said housing and said wedge means, certain springs of said group reacting between said housing and said wedge means and supporting said wedge means in normal operative position.

18. In a railway car truck, a truss type side frame having a central bolster opening and including a box-section tension member beneath said opening with a widened top chord defining a spring seat thereon, a composite spring group including a friction device on said tension member in said opening, and a bolster supported on said group with removable wedge means engaging said device for actuation thereof, said device comprising a housing positioned on said tension member and a plurality of auxiilary springs within said housing supporting spaced sets of friction shoes in frictional engagement with said housing and with said wedge means respectively, certain springs of said group being under direct compression between said wedge means and a portion of said housing.

19. In a railway car truck, a truss type side frame having a central bolster opening and including a box-section tension member beneath said opening with a widened top chord defining a spring seat thereon, a composite spring group including a friction device on said tension member in said opening, and a bolster supported on said group with removable wedge means engaging said device for actuation thereof, said device comprising a housing positioned on said tension member and a plurality of auxiliary springs within said housing supporting spaced sets of friction shoes in frictional engagement with said housing and with said wedge means respectively, certain springs of said group being under direct compression between said wedge means and a portion of said housing and acting to retain said housing in normal operative position.

20. A railway car truck having a truss side frame with upper and lower members and spaced columns defining a bolster opening, a spring group including a friction device on said lower member in said opening, a bolster positioned on said group with arcuate side walls and vertical guide lugs in complementary engagement with said columns, and removable wedge means associated with said bolster for actuation of said friction device, said device comprising a housing with sets of opposed V-shaped friction surfaces and opposed friction shoes engaging each set, each set of said shoes having reversely arranged diagonal face engagement with an adjacent wedge means, certain springs of said group acting to retain said wedge means in normal operative position.

21. A railway car truck having a truss side frame with upper and lower members and spaced columns defining a bolster opening, a spring group including a friction device on said lower member in said opening, a bolster positioned on said group with arcuate side walls and vertical guide lugs in complementary engagement with said columns, and removable wedge means associated with said bolster for actuation of said friction device, said device comprising a housing with sets of opposed V-shaped friction surfaces and opposed friction shoes engaging each set, each set of said shoes having reversely arranged diagonal face engagement with an adjacent wedge means, certain springs of said group being under direct compression between said wedge means and a portion of said housing.

22. A railway car truck having a truss side frame with upper and lower members and spaced columns defining a bolster opening, a spring group including a friction device on said lower member in said opening, a bolster positioned on said group with arcuate side walls and vertical guide lugs in complementary engagement with said columns, and removable wedge means associated with said bolster for actuation of said friction device, said device comprising a housing with sets of opposed V-shaped friction surfaces and opposed friction shoes engaging each set, each set of said shoes having reversely arranged diagonal face engagement with an adjacent wedge means, certain springs of said group being under direct compression between said wedge means and a portion of said housing and acting to retain said wedge means in normal operative position.

23. In a railway car truck, a truss side frame having top and bottom members and spaced columns defining a bolster opening, arcuate guide faces centrally positioned on said columns, a composite spring group on said bottom member in said opening and including friction means comprising a housing, a bolster supported on said spring group with arcuate side walls in complementary engagement with said guide faces, and removable wedge means associated with said bolster for actuation of said friction means, certain springs of said group being under direct compression between said wedge means and a portion of said housing and acting to retain said wedge means in normal operative position, and other springs of said group supporting shoes in frictional engagement with said wedge means and said housing.

24. In a railway car truck, a supporting member having a spring seat, a composite spring group thereon including a friction device comprising a housing, a member supported on said spring group, and removable wedge means associated therewith for actuation of said device, certain springs of said group being under direct compression between a portion of said housing and said wedge means and acting to maintain said wedge means in normal operative position, and other springs of said group supporting friction shoes within said housing in frictional engagement therewith and with said wedge means.

25. In a railway car truck, a supporting member having a spring seat, a composite spring group thereon including a friction device comprising a housing, a member supported on said spring group, removable wedge means associated therewith for actuation of said device, certain springs of said group being under direct compression between a portion of said housing and said wedge means, said housing comprising sets of opposed V-shaped vertical friction faces, and pairs of friction shoes seated against said sets respectively.

26. In a railway car truck, a supporting member having a spring seat, a composite spring group thereon including a friction device comprising a housing, a member supported on said spring group, removable wedge means associated therewith for actuation of said device, certain springs of said group being under direct compression between a portion of said housing and said wedge means, said housing comprising sets of opposed V-shaped vertical friction faces, and pairs of friction shoes seated against said sets respectively, the shoes of each pair engaging an adjacent wedge means.

27. In a railway car truck, a supporting member having a spring seat, a composite spring group thereon including a friction device comprising a housing, a member supported on said spring group, removable wedge means associated therewith for actuation of said device, certain springs of said group being under direct compression between a portion of said housing and said wedge means, said housing comprising sets of opposed V-shaped vertical friction faces, and pairs of friction shoes seated against said sets respectively, the shoes of each pair engaging an adjacent wedge means along reversely arranged diagonal faces.

28. In a railway car truck, a supporting member having a spring seat, a composite spring group thereon including a friction device having a housing with spaced sets of opposed friction faces, pairs of shoes seated against said sets respectively, a bolster supported on said spring group, and a removable member associated with said bolster and having downwardly projecting wedge means respectively engaging said pairs of shoes for actuation thereof.

29. In a railway car truck, a supporting member having a spring seat, a composite spring group thereon including a friction device having a housing with spaced sets of opposed friction faces, pairs of shoes seated against said sets respectively, a bolster supported on said spring group, and a removable member associated with said bolster and having downwardly projecting wedge means respectively engaging said pairs of shoes for actuation thereof, certain springs of said group being under direct compression between a portion of said housing and said removable member.

30. In a railway car truck, a supporting member having a spring seat, a composite spring group thereon including a friction device having a housing with spaced sets of opposed friction faces, pairs of shoes seated against said sets respectively, a bolster supported on said spring group, and a removable member associated with said bolster and having downwardly projecting wedge means respectively engaging said pairs of shoes for actuation thereof, certain springs of said group being under direct compression between a portion of said housing and said removable member and acting to retain said removable member in normal operative position.

31. In a railway car truck, a truss type side frame having a central bolster opening and including a box section tension member beneath said opening with a widened top chord defining a spring seat thereon, a composite spring group on said tension member and including a device with friction shoes, and a bolster supported on said group with removable wedge means engaging said device for actuation thereof, said device comprising a housing in frictional engagement with said shoes, certain springs of said group affording support for said shoes and other springs of said group being under direct compression between a portion of said housing and said wedge means and acting to retain said wedge means in assembled relationship with said bolster.

32. In a railway car truck, a truss side frame having top and bottom members and spaced columns defining a bolster opening, a composite spring group on said bottom member in said opening and including friction means comprising a housing, a bolster supported on said group with side walls in complementary engagement with said columns, and removable wedge means associated with said bolster for actuation of said friction means, certain springs of said group operating to support friction shoes in engagement with said housing and with said wedge means, and other springs of said group acting to retain said wedge means in position against said bolster.

ROBERT B. COTTRELL.